US007525699B2

(12) United States Patent
Mai et al.

(10) Patent No.: US 7,525,699 B2
(45) Date of Patent: Apr. 28, 2009

(54) BACK-LIGHT MODULE FOR IMAGE SCANNING DEVICE AND METHOD FOR CALIBRATING ILLUMINATION WITH BACK-LIGHT MODULE

(76) Inventors: Che-Kuei Mai, No. 1-1, R&D Rd. Science-based Industrial Park, Hsinchu (TW); Tsung-Yin Chen, No. 1-1, R&D Rd. Science-based Industrial Park, Hsinchu (TW)

( * ) Notice: Subject to any disclaimer, the term of this patent is extended or adjusted under 35 U.S.C. 154(b) by 0 days.

(21) Appl. No.: 11/301,805

(22) Filed: Dec. 12, 2005

(65) Prior Publication Data

US 2007/0030537 A1 Feb. 8, 2007

Related U.S. Application Data

(63) Continuation of application No. 09/900,865, filed on Jul. 10, 2001, now Pat. No. 6,999,212.

(51) Int. Cl.
*H04N 1/04* (2006.01)

(52) U.S. Cl. ....................... 358/474; 358/497; 358/475; 358/509

(58) Field of Classification Search ................. 358/474, 358/497, 496, 504, 505, 516, 509
See application file for complete search history.

(56) References Cited

U.S. PATENT DOCUMENTS

| | | | | |
|---|---|---|---|---|
| 5,062,144 | A * | 10/1991 | Murakami | 382/274 |
| 5,099,341 | A * | 3/1992 | Nosaki et al. | 358/461 |
| 5,359,458 | A * | 10/1994 | Melman et al. | 359/799 |
| 5,495,329 | A * | 2/1996 | Anderson et al. | 356/218 |
| 5,510,896 | A | 4/1996 | Wafler | |
| 5,764,493 | A * | 6/1998 | Liao | 362/602 |
| 5,850,298 | A | 12/1998 | Narahara et al. | |
| 6,091,445 | A * | 7/2000 | Matsui et al. | 348/96 |
| 6,198,841 | B1 | 3/2001 | Toyama et al. | |
| 6,229,627 | B1 | 5/2001 | Taguchi et al. | |
| 6,288,798 | B1 | 9/2001 | Sharma | |
| 6,417,937 | B1 | 7/2002 | Batten et al. | |
| 6,445,480 | B1 * | 9/2002 | Huang et al. | 359/196 |
| 6,486,954 | B1 * | 11/2002 | Mieher et al. | 356/401 |
| 6,486,980 | B1 * | 11/2002 | Sawanobori | 358/487 |
| 6,552,829 | B1 | 4/2003 | Maciey et al. | |
| 6,687,024 | B1 * | 2/2004 | Short et al. | 358/474 |
| 6,980,335 | B2 | 12/2005 | Kubo | |
| 6,999,212 | B2 * | 2/2006 | Mai et al. | 358/504 |
| 7,173,743 | B2 | 2/2007 | Yamazaki | |
| 2001/0030278 | A1 | 10/2001 | Koshimizu | |
| 2007/0230779 | A1 | 10/2007 | Sato | |

* cited by examiner

*Primary Examiner*—Negussie Worku
(74) *Attorney, Agent, or Firm*—Solowitz Ford Cowger LLP

(57) ABSTRACT

A back-light module for an image scanning device includes a casing, a pair of tubular lamps, a light guide plate, and a frosted transparent plate. The image scanning device includes a document supporting plate and an optical scanning module movable in a longitudinal direction. A calibration of illumination with the back-light module is done by (1) activating the back-light module to project light onto the optical scanning module, (2) driving the optical scanning module in the longitudinal direction, (3) obtaining illumination signals associated with selected pixels of a longitudinally-extending calibration zone formed on the document supporting plate, (4) comparing each illumination signal with a reference to obtain a result and manipulating the result to obtain a calibration parameter, and (5) calibrating the illumination of pixels of an image with the corresponding calibration parameters in scanning a transmissive original document.

25 Claims, 5 Drawing Sheets

BACK-LIGHT MODULE FOR IMAGE SCANNING DEVICE AND METHOD FOR CALIBRATING ILLUMINATION WITH BACK-LIGHT MODULE

This is a Continuation Patent Application of U.S. patent application Ser. No. 09/900,865 filed Jul. 10, 2001 now U.S. Pat. No. 6,999,212 titled, "Back-Light Module For Image Scanning Device and Method for Calibrating Illumination with the Back-Light Module" by Che-Kuei Mai, assigned to the assignee of the claimed subject matter.

BACKGROUND OF THE INVENTION

1. Field of the Invention

The present invention generally relates to a back-light module of image scanning devices for transmissive original documents, and in particular to a method for calibration of illumination in order to obtain a substantially uniform illumination over an original document 2. Description of the Prior Art Document scanners are generally classified in two types for respectively handling a reflective original document which comprises an opaque substrate and a transmissive original document which comprises a transparent substrate. A transmissive original document scanner comprises a back-light module for generating light projecting the image formed on an original onto an image sensor system of the document scanner.

A conventional back-light module comprises a movable line-type light source which is moved in a given direction from one end of the original document to an opposite end. A driving system is required to move the light source which complicates the overall structure of the back-light module.

Another conventional back-light module comprises a surface-type light source which requires no movement of any parts of the back-light module. FIG. 1 of the attached drawings shows an image scanning device having a back-light module comprising a surface-type light source and FIG. 2 shows an exploded view of the back-light module.

As shown in FIG. 1, a conventional scanner for transmissive original documents, designated with reference numeral 1, comprises a housing (not labeled) having a transparent document supporting plate 10 for supporting an original document (not shown) containing an original and a back-light module 3 in the form of a flip cover for selectively covering the document supporting plate 10. An optical scanning module 11 comprising a sensor system is movably supported inside the housing by guide rails 12, 13 for moving in a longitudinal direction (Y direction) under the control of a control unit 14. The sensor system comprises a line of sensing elements, such as an array of CCD (Charge Coupling Device), arranged in a lateral direction (X direction) onto which a "scan line" of the original is projected by light generated by the back-light module 3. The sensing elements convert the optical signal caused by the scan line into electrical representation of the scan line. By moving the optical scanning module in the longitudinal direction line by line or step by step and scanning the original one scan line at a time, the original or a portion of the original document may be scanned.

As shown in FIG. 2, the back-light module 3 comprises a casing 31 having an open bottom closed by a bottom plate 32. An opening 32*a* is defined in a central area of the bottom plate 32 receiving and retaining a transparent plate 37. Two tubular lamps 41, 42, such as cold cathode fluorescent lamps, are arranged inside the casing 31 and spaced from each other with a light guide plate 34 disposed therebetween. Two diffusion boards 35, 36 are arranged between the light guide plate 34 and the transparent plate 37. Light from the tubular lamps 41, 42 are guided by the light guide plate 34 for spreading over and projecting from the light guide plate 34 onto the diffusion boards 35, 36. The light is further distributed by the diffusion boards 35, 36 to uniformly project toward and through the transparent plate 37. A reflective sheet 33 is arranged between the light guide plate 34 and a top of the casing 31 for directing light back to the transparent plate 37.

Since uniform distribution of light is required in obtaining good result of scanning transparent original documents, the diffusion boards 35, 36 are important parts for the conventional scanner. Although an illumination calibration zone 2 extending in the direction of the CCD array, namely the X direction (or the lateral direction as defined above), for calibration of illumination of the back-light source, there is no way in the conventional design to calibrate illumination in the Y direction (or the longitudinal direction as defined above). Uniformity of illumination in the Y direction is in generally achieved by the diffusion boards 35, 36. However, using diffusion boards to uniformly distribute light complicates the overall structure of the back-light module and increases costs.

Thus, it is desired to provide a back-light module of an image scanning device for overcoming the above discussed problems.

SUMMARY OF THE INVENTION

Accordingly, an object of the present invention is to provide a back-light module of an image scanning device having a simple structure and thus low costs.

Another object of the present invention is to provide a method for operating the back-light module to achieve an excellent scanning result of a transparent original document.

According to the present invention, a back-light module of an image scanning device comprises a casing having an open bottom, a pair of tubular lamps mounted inside the casing with a light guide plate arranged between the lamps and a frosted transparent plate attached to the open bottom of the casing. The image scanning device includes a document supporting plate for supporting a transmissive original document and an optical scanning module containing sensing elements arranged in a line in a lateral direction and movable in a longitudinal direction in a scan line by scan line fashion. The back-light module is selectively positioned on the document supporting plate with the frosted plate facing the document. Light is projected from the back-light module through the document and toward the sensing elements. The frosted plate functions to more uniformly distribute the light over the document supporting plate.

A method for calibrating illumination of a surface type back-light source is also provided in the present invention. The calibration of illumination is done by (1) activating the back-light module to project light onto the sensing elements, (2) driving the optical scanning module in the longitudinal direction, (3) obtaining illumination signals associated with selected pixels of a longitudinally-extending calibration zone formed on the document supporting plate, (4) comparing each illumination signal with a reference to obtain a result and manipulating the result to obtain a calibration parameter, and (5) calibrating illumination of pixels of an image with the corresponding calibration parameters in scanning a transmissive original document on which the image is formed to obtain an excellent scanning result of the document.

BRIEF DESCRIPTION OF THE DRAWINGS

The present invention will be apparent to those skilled in the art by reading the following description of a preferred embodiment and the best mode of operation thereof with reference to the attached drawings, in which.

DETAILED DESCRIPTION OF THE PREFERRED EMBODIMENTS

Figure 1:
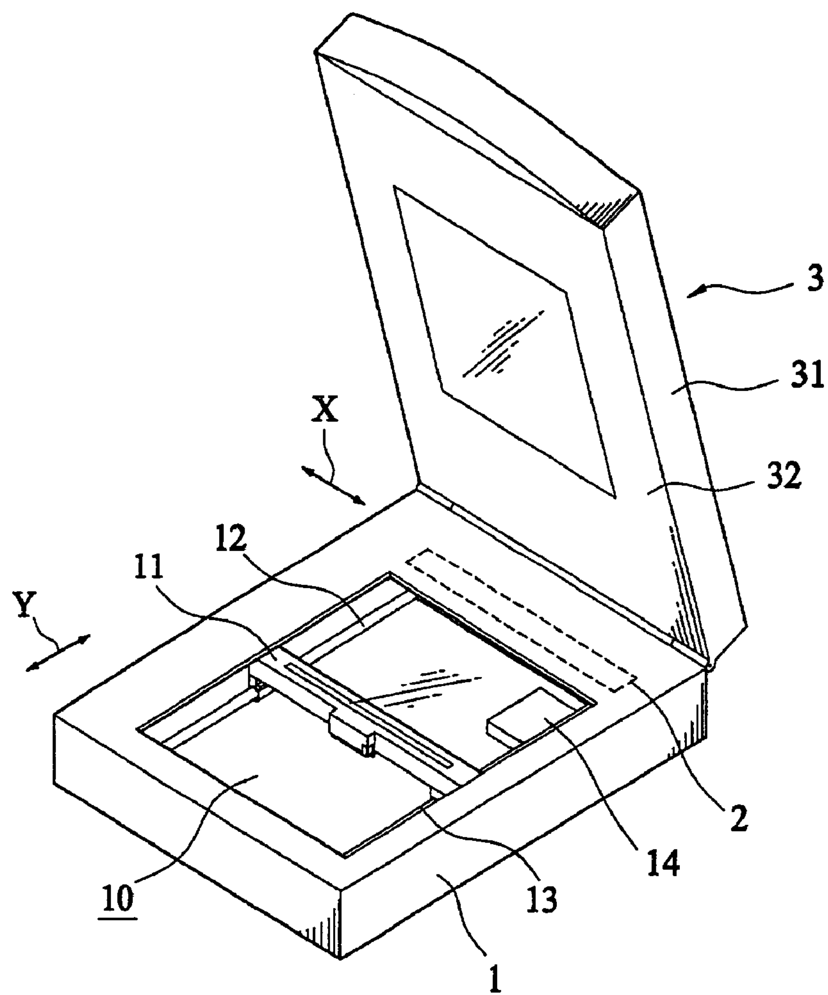
FIG. 1 is a perspective view of a conventional flat bed image scanning device having a back-light module thereon.
Figure 2:
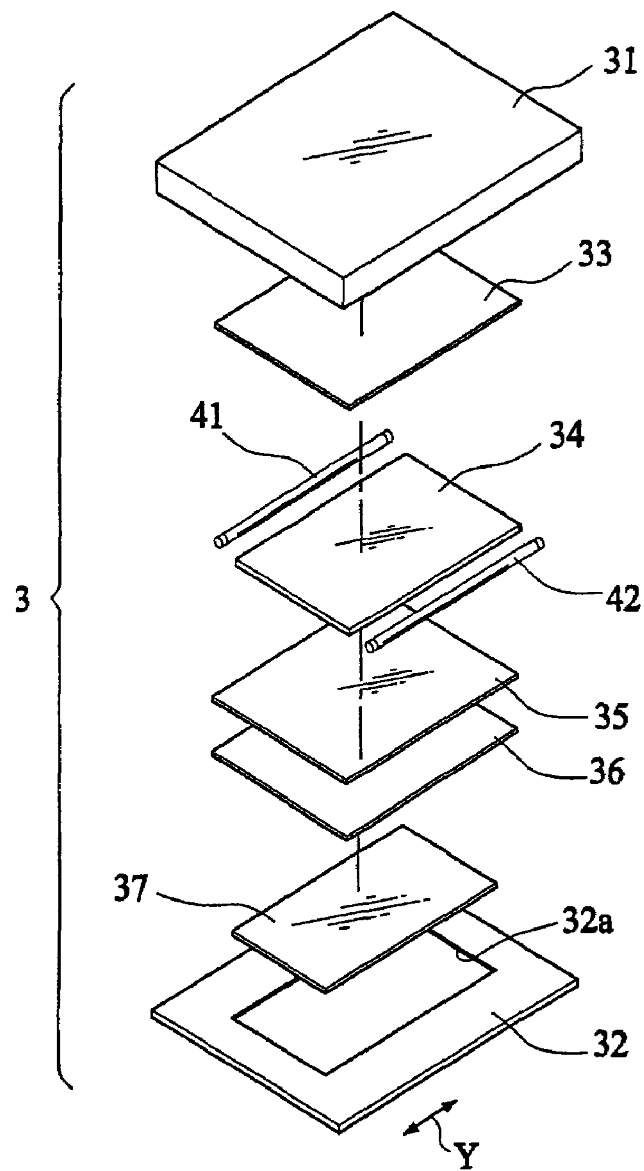
FIG. 2 is an exploded view of the back-light module of the conventional image scanning device of FIG. 1.
Figure 3:
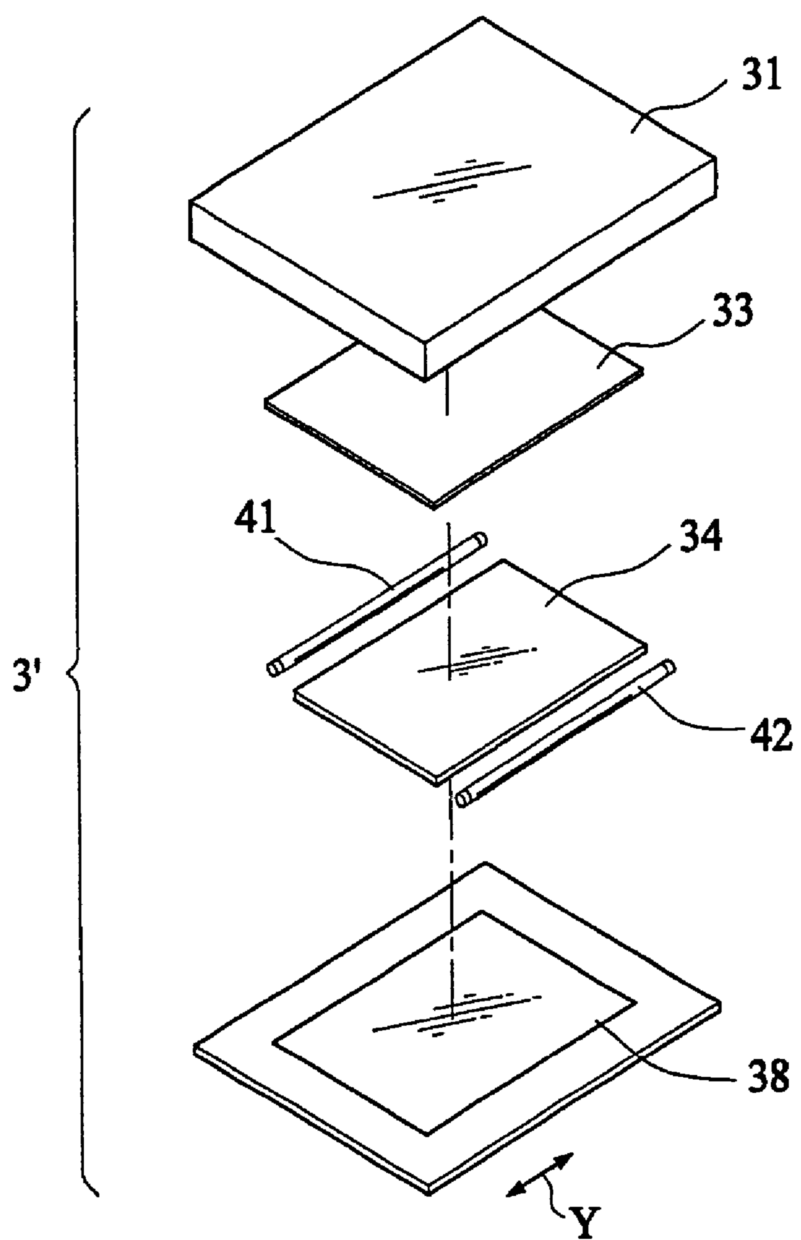
FIG. 3 is an exploded view of a back-light module constructed in accordance with the present invention.

With reference to the drawings and in particular to FIG. 3, a back-light module constructed in accordance with the present invention, generally designated with reference numeral 3', is shown. It is to be noted that, for simplicity, similar elements through the drawings will be designated with same or like reference numerals.

The back-light module 3' comprises a casing 31 inside which two spaced tubular lamps 41, 42, such as cold cathode fluorescent lamps. A light guide plate 34 is arranged between the tubular lamps 41, 42. A reflective sheet 33 is located between the light guide plate 34 and the casing 31. A frosted light-transmissive plate 38, such as a frosted transparent acrylic board, is attached to a bottom opening (not labeled) of the casing 31 opposing the light guide plate 34 for distributing light from the light guide plate 34. The frosted light-transmissive plate 38 also protects the light guide plate 34 and prevents debris and other contamination from entering the casing 31.

Figure 4:
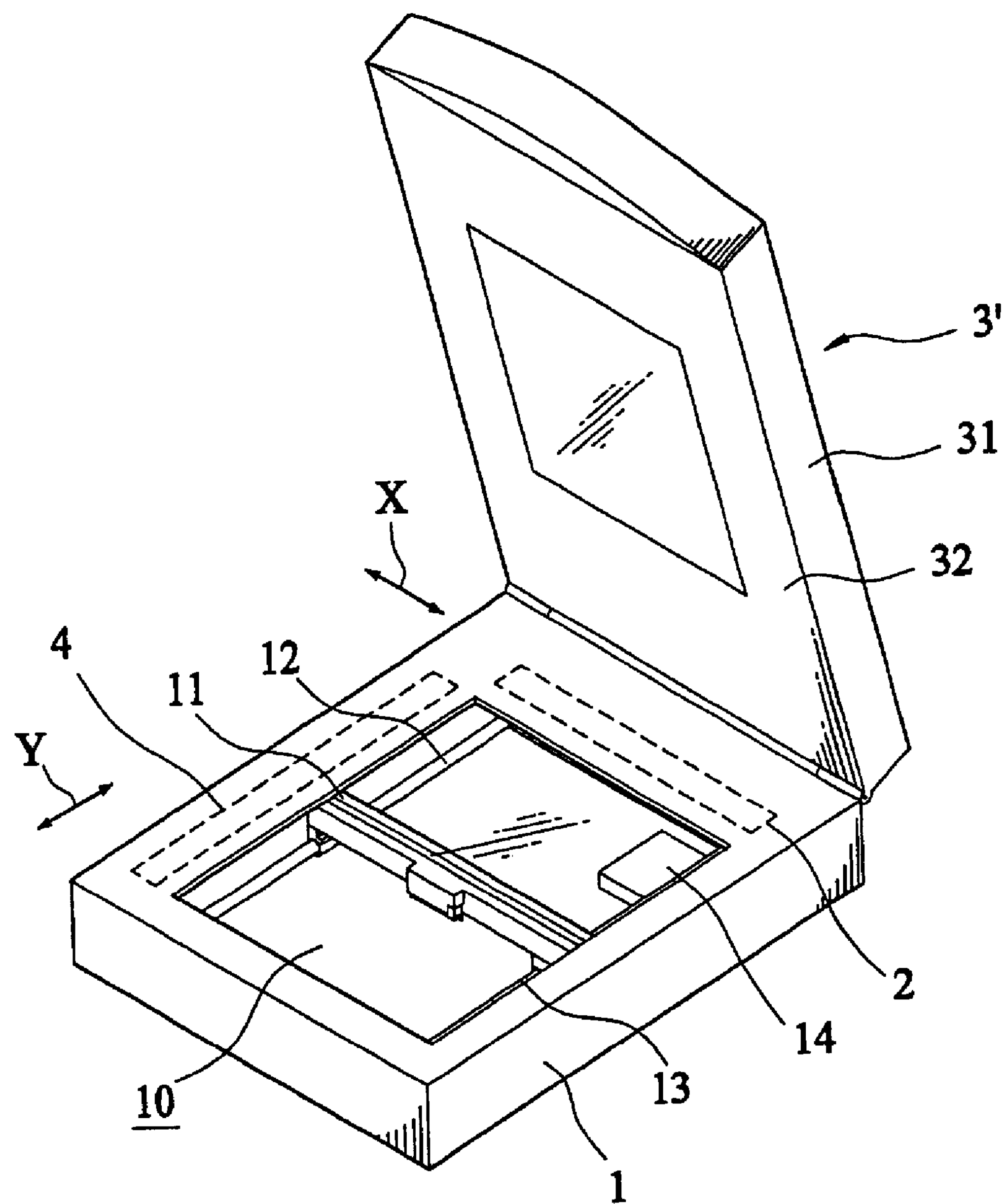
FIG. 4 is a perspective view of an image scanning device constructed in accordance with the present invention.

FIG. 4 shows an image scanning device, generally designated with 10 reference numeral 1, incorporating the back-light module 3' of the present invention. The image scanning device 1 comprises a housing having a top surface, providing a document supporting plate 10. The back-light module 3' is pivotally attached to the housing for selectively positioning on the document supporting plate 10 or covering an original document placed on the document supporting plate 10. A pair of guide rails 12, 13 extending in a longitudinal direction (Y direction) is arranged inside the image scanning device for movably supporting an optical scanning module 11 whereby the optical scanning module 11 is controlled by a control unit 14 to move in the longitudinal direction Y.

The image scanning device 1 comprises a line of image sensing elements (not shown), such as a CCD array, extending in a lateral direction (X direction) for detecting a scan line of the original document when light is generated by and projected from the back-light module 3', through the transmissive original document, onto the optical scanning module 11.

A first calibration zone or X-directional calibration zone 2 extending in the X direction (lateral direction) is attached to the bottom surface of the document supporting plate 10 for calibration of illumination in the lateral direction, namely the X direction. A second calibration zone or Y-directional calibration zone 4 extending in the Y direction (longitudinal direction) is attached to the bottom surface of the document supporting plate 10 for calibration of illumination in the Y direction. By means of the provision of the second calibration zone 4, a calibration of illumination of the light projected from the frosted plate 38 can be performed to obtain an excellent scanning result without using diffusion boards employed in the conventional scanner.

Figure 5:
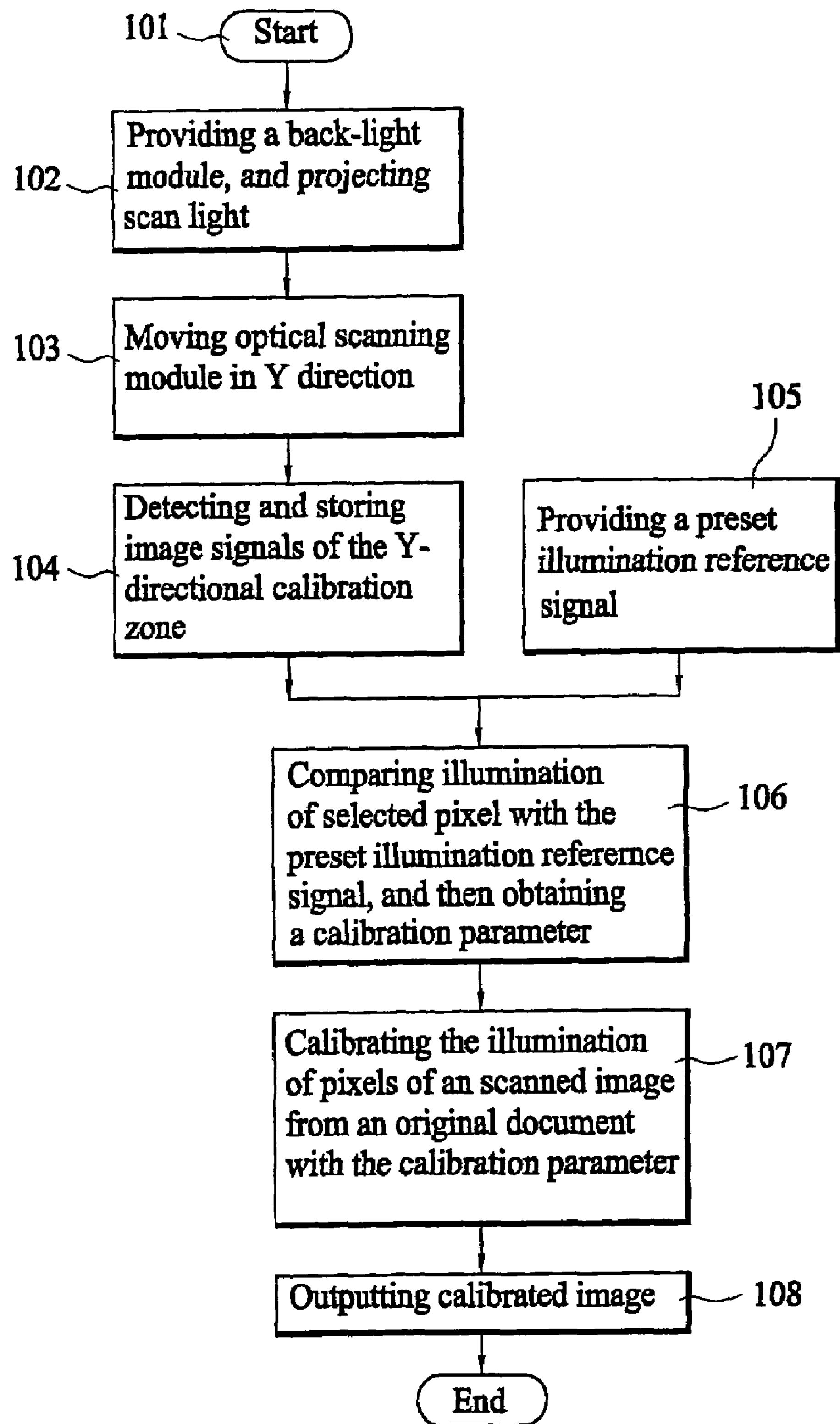
FIG. 5 is a flow chart of a method for calibrating illumination of the back-light module of the present invention.

FIG. 5 shows a flow chart of illumination calibration carried out in accordance with the present invention. The calibration of illumination in the lateral direction is known to those skilled in the art and no further discussion will be given herein. The operation of illumination calibration performed by the flow chart of FIG. 5 is mainly for calibration of illumination in the longitudinal direction (Y direction). The operation begins at step 101. The back-light module 3' is provided and activated to generate and project light onto the optical scanning module 11 (step 102). The optical scanning module 11 is then driven to sequentially move from one scan line to the next one in the Y direction or longitudinal direction (step 103). The image sensing elements of the scanning device I detect an image signal of each pixel of the second calibration zone 4 when moving in the Y direction and convert and store the optical signal into an electrical representation corresponding to illumination of the pixel (step 104). The storage of the electrical signals can be done with memory means provided in the scanner. If desired, the electrical representation may be taken at a given number of scan lines, such as every five scan lines. That is the optic signal of the pixels is taken every five successive pixels in the longitudinal direction. In case of color scanners, different electrical representation for red, green and blue colors can be taken separately.

In step 105, a preset illumination reference signal is provided, which may be stored in a memory unit of the scanner. Then, the electrical representation of the illumination of selected pixel is compared with the preset illumination reference signal in step 106. The comparison result is then used to evaluate the difference of illumination between two successively-taken pixels that belong to different scan lines and a calibration parameter indicating the difference is obtained based on the difference of illumination (step 106). The parameters are then stored. In case of color scanners, different parameters are obtained for red, green and blue colors of each image pixel.

The stored parameters may be retrieved later to calibrate the illumination of pixels of an image obtained from a transmissive original document. When an original document is scanned, the illumination of each pixel is obtained through the sensing elements of the image scanning device. The illumination of each pixel is then calibrated with the corresponding parameter that is obtained previously and stored in the memory means (step 107). After each pixel is calibrated with the corresponding parameter, the whole image may then output through suitable output means (step 108).

In brief, the scanner in accordance with the present invention employs a frosted plate to replace the diffusion boards adapted in the conventional scanner. This simplifies the overall structure and reduces the costs. The illumination of each pixel of an image that is being scanned is then calibrated with the corresponding calibration parameter previously obtained to alleviate and even overcome the possible non-uniform distribution of illumination in the longitudinal direction. An excellent quality of image can thus be obtained.

Although the present invention has been described with reference to the preferred embodiment and the best mode of operation thereof, it is apparent to those skilled in the art that a variety of modifications and changes may be made without departing from the scope of the present invention which is intended to be defined by the appended claims.

What is claimed is:

1. An apparatus: comprising:

an optical scanning module being capable of being driven in a longitudinal direction;

a first transmissive calibration zone in the longitudinal direction;

a back-light module capable of illuminating the optical scanning module;

a second transmissive calibration zone in a latitudinal direction, wherein the first transmissive calibration zone and the second transmissive calibration zone are disposed between the back light module and the optical scanning module; and a processing module capable of obtaining a signal of a selected pixel of one of the calibration zones, wherein the processing module is further capable of:

obtaining a calibration parameter; and calibrating the illumination of an image;

wherein the back-light module comprises:

a light guide plate; and a light-transmissive plate to distribute light guided by the light guide plate, the distributed light for illuminating a document represented by the obtained signal.

2. The apparatus of claim 1, wherein the light transmissive plate is frosted.

3. The apparatus of claim 2, wherein the back-light module comprises a reflective surface disposed between the light guide plate and a casing of the back-light module.

4. The apparatus of claim 1, wherein the light-transmissive plate is disposed below the light guide plate.

5. The apparatus of claim 4, wherein the light-transmissive plate is frosted.

6. The apparatus of claim 1, wherein the back-light module comprises a reflective surface disposed between the light guide plate and a casing of the back-light module.

7. The apparatus of claim 3, wherein a light source is adjacent to the light guide plate.

8. The apparatus of claim 1, wherein the processing module is operable to:

analyze the signal to obtain an illumination value corresponding to the selected pixel;

compare the obtained illumination value to a stored illumination reference value; and identify the calibration value according to the comparison.

9. The apparatus of claim 8, wherein the processors are further operable to calibrate the illumination of the image according to the calibration value.

10. An apparatus, comprising:

means for projecting light onto a transmissive document, a portion of the projected light to pass through the transmissive document and illuminate an optical scanning module;

means for driving the optical scanning module in a longitudinal direction;

a transmissive calibration zone in the longitudinal direction;

a transmissive calibration zone in a lateral direction, wherein the transmissive calibration zones are disposed between the light projecting means and the optical scanning module;

means for obtaining a signal of a selected pixel of one of the calibration zones;

means for comparing the signal with a pre-set reference to obtain a calibration parameter; and means for calibrating an illumination of an image according to the calibration parameter.

11. The apparatus of claim 10, wherein said optical scanning module further comprises means for obtaining an image signal of a selected pixel.

12. The apparatus of claim 10, wherein said selected pixel represents red, green and blue colors.

13. The apparatus of claim 10, further comprising means for determining said calibration parameter with respect to the signal and a reference illumination intensity.

14. The apparatus of claim 13, further comprising a means for retrieving the reference from storage in a memory unit.

15. The apparatus of claim 10, wherein the means for projecting light comprises a frosted light-transmissive plate.

16. The apparatus of claim 15, wherein the means for projecting light further comprises a light guiding plate disposed on the frosted light-transmissive plate.

17. The apparatus of claim 10, further comprising a housing, wherein the means for projecting light is pivotally attached to the housing.

18. An apparatus, comprising:

an optical scanning module being capable of being driven in a longitudinal direction;

a first transmissive calibration zone in the longitudinal direction;

a back-light module capable of illuminating the optical scanning module;

a second transmissive calibration zone in a latitudinal direction, wherein the first transmissive calibration zone and the second transmissive calibration zone are disposed between the back light module and the optical scanning module; and a processing module capable of obtaining a signal of a selected pixel of one of the calibration zones, wherein said processing module is further capable of:

obtaining a calibration parameter; and calibrating the illumination of an image;

wherein the back-light module comprises:

a casing;

a light source in the casing;

a light guide plate adjacent to the light sources;

a reflective sheet between the casing and the light guide plate; and a frosted light-transmissive plate disposed below the light guide plate.

19. The apparatus of claim 18, wherein the casing includes two cold cathode fluorescent lamps and wherein the light guide plate is disposed between the two lamps.

20. The apparatus of claim 18, further comprising a housing, wherein the back-light module is pivotally attached to the housing.

21. The apparatus of claim 18, wherein the casing includes a plurality of light sources.

22. An apparatus, comprising:

a back-light module;

a light sensor to receive light generated by the back light module;

a document holder for holding a document between the back-light module and the light sensor;

a light source in the back-light module, the light source for illuminating the document and allowing light representing at least a portion of the document to be received by the light sensor; and calibration circuitry operable to:

obtain data corresponding to a first portion of a first scan line and a second portion of a second different scan line;

determine a difference in illumination intensity between the first portion of the first scan line and the second portion of the second different scan line; and identify a calibration value based on the determined difference.

23. The apparatus of claim 22, wherein the calibration circuitry is further operable to:

obtain a pixel representing at least a portion of the document; and change an illumination intensity the pixel according to the identified calibration value.

24. The apparatus of claim 22, wherein the calibration circuitry is further operable to:

compare an illumination intensity of a calibration zone to a present illumination reference signal, the comparison providing a comparison result; and determine the difference in illumination intensity between the first portion of the first scan line and the second portion of the second different scan line using the comparison result.

25. The apparatus of claim 24, wherein the calibration zone represented by the compared illumination intensity is attached to a bottom surface of the document holder and oriented in a direction that is perpendicular to the scan lines.

* * * * *

UNITED STATES PATENT AND TRADEMARK OFFICE

CERTIFICATE OF CORRECTION

PATENT NO. : 7,525,699 B2
APPLICATION NO. : 11/301805
DATED : April 28, 2009
INVENTOR(S) : Mai et al.

It is certified that error appears in the above-identified patent and that said Letters Patent is hereby corrected as shown below:

Title Pg, Item (54), please replace “WITH BACK-LIGHT MODULE” with --WITH THE BACK-LIGHT MODULE--.
Title Pg, Item (74), please replace “Solowitz” with --Stolowitz--.
At column 1, line 3, please replace “WITH BACK-LIGHT MODULE” with --WITH THE BACK-LIGHT MODULE--.
At column 5, line 2, please replace “An apparatus: comprising:” with --An apparatus, comprising:--.
At column 5, line 12, please replace “back light module” with --back-light module--.
At column 6, line 28, please replace “back light module” with --back-light module--.
At column 6, line 52, please replace “the back light” with --the back-light--.

Signed and Sealed this

Twentieth Day of July, 2010

David J. Kappos
*Director of the United States Patent and Trademark Office*